No. 888,617. PATENTED MAY 26, 1908.
M. R. JOHNSON.
JEWELER'S LOOP.
APPLICATION FILED MAR. 3, 1908.

Witnesses

Inventor
M. R. Johnson,
By Beeler & Robb
Attorneys

UNITED STATES PATENT OFFICE.

MANUEL R. JOHNSON, OF AXTELL, NEBRASKA.

JEWELER'S LOOP.

No. 888,617.  Specification of Letters Patent.  Patented May 26, 1908.

Application filed March 3, 1908. Serial No. 418,976.

*To all whom it may concern:*

Be it known that I, MANUEL R. JOHNSON, a citizen of the United States, residing at Axtell, in the county of Kearney and State of Nebraska, have invented certain new and useful Improvements in Jewelers' Loops, of which the following is a specification.

This invention relates to that class of optical instruments known as watchmakers' or jewelers' eyeglasses or loops, and which are adapted for use in doing close work, necessitating the employment of glasses of high magnifying power and at short distance or focus. An eyeglass or loop of this type usually comprises a cylindrical frame, one end of which is outwardly turned or flared whereby it may be held within the orbit of the eye by contraction of the ocular muscles, the other end of the cylinder being fitted with the magnifying lens. In order to secure the best results the cylinders should be opaque, and to this end they are usually constructed of rubber, bone, or light metal and having the inner surface coated black to prevent objectionable reflections of light. Again, as commonly made, the loop when applied to the eye is completely closed, causing annoyance or injury to the eye by heat and want of ventilation and also a resulting deposition of moisture upon the inner surface of the lens. Furthermore, the eye fitted with a loop of the common type is incapacitated for seeing ordinary work, and a jeweler, for instance, who would combine the duties of bench-workman and salesman is constantly required to apply or remove his loop according to his varied duties, a matter of considerable loss of time and annoyance.

The object of the present invention is to overcome the several foregoing disadvantages of the ordinary type of loops and yet retain substantially all the virtue of the closed loop. This object is attained, as I have thoroughly demonstrated by practical experience, by providing a cylinder or tube of any suitable opaque material, provided as usual at its outer end with a suitable lens, but whose larger or flared end lies in a plane inclined to the plane of the lens. In other words one side of the tube is shorter between the flared rim and the lens than the other, the longer side being partially cut away and partially indented to permit an unobstructed view therethrough without moving or removing the loop from the eye.

For a full understanding of the invention reference is to be had to the following detail description and to the accompanying drawings forming a part of this specification and in which,—

Figure 1:
Figure 2:
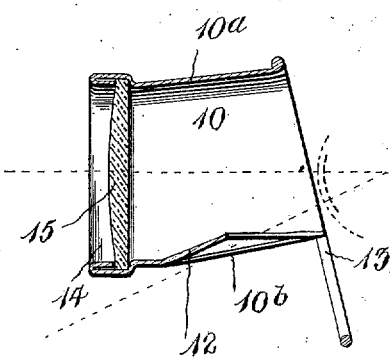
Figure 3:
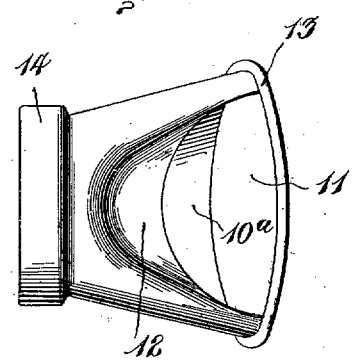

Figure 1 is a general perspective indicating the invention as applied to the eye; Fig. 2 is a central longitudinal section, with a diagram indicating several lines of vision, and Fig. 3 is a side elevation.

Like parts are indicated by similar reference characters in the several figures.

Specifically describing my invention, the numeral 10 indicates a rigid frame, cylinder, or tube having the shorter side $10^a$ and the longer side $10^b$, the latter side being provided with an opening 11 and an indentation 12. The rim or edge 13 which fits into the ocular orbit is continuous or unbroken and is slightly elliptical in form, due to the inclination or angle between its plane and that of the outer end 14 of the tube and the lens 15. The form of the rim 13, moreover, provides a better fit to the orbit than does the usual circular loop. The opening 11 is formed adjacent to the rim 13 and is large enough to afford an unobstructed view for all practical purposes. The loop is positioned at either eye so that the opening 11 will be on the side next to the nose and as high or as low as the workman may desire, depending upon the character of the work. The portion 12 of the tube is adjacent to the opening 11 and is bent inwardly toward the center of the rim 13. By this construction it will be appreciated that by the movement of the eye through a very slight angle the line of vision may pass either through the lens, coinciding with the axis thereof, or else through the opening 11, and yet sufficient of the tube is retained to insure a dark interior. The opening 11, however, provides sufficient ventilation for the eye to prevent undue warmth or clouding of the lens.

Having thus described the preferred embodiment of my invention, I claim

1. A jeweler's loop comprising an opaque tube having a continuous rim at one end, and a lens at the other end, and an opening being provided in one side of the tube adjacent to the rim, whereby the line of vision may pass either through the lens or through said opening.

2. A jeweler's loop comprising a tube having at one end a continuous rim for engagement with the ocular orbit, a lens secured in the other end of said tube, there being provided an opening in one side of the tube adjacent to the rim, and a portion of the said side between said opening and the lens being indented toward the center of the rim, for the purposes set forth.

3. The herein described jeweler's loop comprising a rigid frame having a rim at one end and a lens secured to the other end, said rim and lens lying in planes oblique to each other, substantially as and for the purposes set forth.

4. A jeweler's loop consisting of a tubular frame having a longer and a shorter side and a continuous rim, the longer side of the frame being provided with an opening adjacent to the rim and an indentation adjacent to said opening, and a lens secured to the end of the frame farthest from the rim, the planes of the lens and rim being oblique to each other.

In testimony whereof I affix my signature in presence of two witnesses.

MANUEL R. JOHNSON.

Witnesses:
J. D. ENGLAND,
JOHN L. OLSON.